United States Patent
Lepley et al.

(10) Patent No.: US 6,680,439 B2
(45) Date of Patent: Jan. 20, 2004

(54) COMPOSITE ELECTRICAL INSULATOR HAVING AN OUTER COATING AND AT LEAST ONE OPTICAL FIBER COMPATIBLE THEREWITH

(75) Inventors: Damien Lepley, Vichy (FR); Eric Moal, Saint-Yorre (FR)

(73) Assignee: Sediver Societe Europeenne d'Isolateurs er. Verre et Composite, Nanterre (FR)

( * ) Notice: Subject to any disclaimer, the term of this patent is extended or adjusted under 35 U.S.C. 154(b) by 0 days.

(21) Appl. No.: 10/152,897

(22) Filed: May 21, 2002

(65) Prior Publication Data

US 2002/0174999 A1 Nov. 28, 2002

(30) Foreign Application Priority Data

May 22, 2001 (FR) .............................. 01 06701

(51) Int. Cl.$^7$ ................................ H01B 17/00
(52) U.S. Cl. ................ 174/137 A; 174/154; 174/117 F
(58) Field of Search ............... 174/137 A, 154, 174/117 F, 168, 208, 117 A

(56) References Cited

U.S. PATENT DOCUMENTS 5,076,881 A * 12/1991 Ferguson .................... 156/436
5,251,640 A * 10/1993 Osborne ..................... 600/585
5,385,319 A * 1/1995 Schotter ..................... 244/3.12
5,643,251 A * 7/1997 Hillsman et al. ............... 606/7
5,700,253 A * 12/1997 Parker ........................ 604/526
6,047,094 A * 4/2000 Kalamkarov et al. .......... 385/12
6,240,231 B1 * 5/2001 Ferrera et al. .............. 385/115

FOREIGN PATENT DOCUMENTS

DE 3815717 11/1989
EP 0926516 6/1999

OTHER PUBLICATIONS

Patent Abstracts of Japan, vol. 1998, No. 11, Sep. 30, 1998 & JP 10 162668 A (NGK Insulators LTD). Jun. 19, 1998.

* cited by examiner

Primary Examiner—Dean A. Reichard
Assistant Examiner—Jinhee Lee
(74) Attorney, Agent, or Firm—Ware, Fressola, Van Der Sluys & Adolphson LLP

(57) ABSTRACT

A composite electrical insulator includes a support rod generally of a composite material, at least one optical fiber placed on the outer periphery of the support rod, and an outer insulating coating of a vulcanized material surrounding the support rod so as to cover the optical fiber. The optical fiber has an outer sheath of a material that is compatible with the material constituting the outer coating so that a cohesive bond forms between the outer sheath of the optical fiber and the outer coating of the insulator while the outer coating is being vulcanized.

5 Claims, 1 Drawing Sheet

COMPOSITE ELECTRICAL INSULATOR HAVING AN OUTER COATING AND AT LEAST ONE OPTICAL FIBER COMPATIBLE THEREWITH

CROSS-REFERENCE TO RELATED APPLICATIONS

Priority is claimed from French patent application no. 01 06701 filed May 22, 2001.

The invention relates to a composite electrical insulator for a medium or high voltage substation or electricity line, and in particular a composite electrical insulator comprising a support rod generally of a composite material, at least one optical fiber placed on the outer periphery of the support rod, and an outer insulating coating of a vulcanized material surrounding the support rod so as to cover the optical fiber.

BACKGROUND OF THE INVENTION

Such a composite insulator is known from patent document EP-0 926 516.

In that known insulator, the insulating outer coating is compression molded around the support rod to envelop the optical fiber. In order to avoid the presence of any inclusions of air along the optical fiber placed on the support rod, an adhesive agent is used to stick the optical fiber onto the outer periphery of the support rod in such a manner as to be completely covered by the adhesive agent. The outer layer of the optical fiber can be treated to improve its adhesion with the adhesive agent, thereby very significantly increasing the cost of manufacturing the insulator.

OBJECT AND SUMMARY OF THE INVENTION

The object of the invention is to propose another design for such a composite electrical insulator provided with optical fibers.

To this end, the invention provides a composite electrical insulator comprising a support rod generally of a composite material, at least one optical fiber placed on the outer periphery of the support rod, and an outer insulating coating of a vulcanized material surrounding the support rod so as to cover the optical fiber, wherein the optical fiber has an outer sheath of a material that is compatible with the material constituting the outer coating so that a cohesive bond forms between the outer sheath of the optical fiber and the outer coating of the insulator while the outer coating is being vulcanized. With such a structure, the outer coating of the insulator can be injected under high pressure and at high temperature around the support rod and it adheres to the outer sheath of the optical fiber and to the support rod without leaving any inclusions of air. When making an insulator of the invention, there is no need to surround the optical fiber completely in an adhesive agent, and this simplifies manufacture of the insulator. If the support rod is an epoxy resin and glass fiber composite, then the optical fiber is preferably stuck to the support rod using the epoxy resin mixture of the composite. The outer coating of the insulator is generally an elastomer, and the optical fiber is preferably selected to have an outer sheath of thermoplastic elastomer. A plurality of optical fibers, each having its own outer sheath of thermoplastic elastomer, can thus be grouped together in a ribbon by heat-sealing their outer sheaths so as to form an optical fiber ribbon which makes it easier to place the optical fibers on the support rod and to guide them away from the insulator through the metal end-fittings thereof. In addition, such a ribbon of optical fibers formed in this way by heat-sealing and placed on the support rod of the insulator is very easily undone in order to separate the ends of the optical fibers for connection to the terminals of sensors or measurement appliances.

BRIEF DESCRIPTION OF THE DRAWING

The invention and its characteristics and advantages are described in greater detail in the following description given with reference to the figures mentioned below.

MORE DETAILED DESCRIPTION

Figure 1:
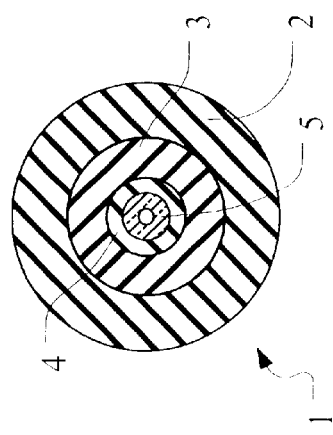
FIG. 1 is a highly diagrammatic section view through an optical fiber of the invention with an outer sheath made of a material that is compatible with the material of the outer coating of the composite insulator.

In FIG. 1, an optical fiber 1 suitable for placing on the support rod of a composite insulator of the invention has an outer sheath 2 that is compatible with the insulating outer coating of the insulator. The outer coating of a composite insulator is generally a vulcanized elastomer. The outer sheath 2 of the optical fiber 1 is made of a material which is selected so as to be compatible with the material used for the outer coating under conditions such that a cohesive bond forms between the outer sheath of the optical fiber and the outer coating of the insulator during vulcanization thereof. The material of the outer sheath 2 of the optical fiber is preferably an elastomer known under the trademark "Hytrel". In the optical fiber of the invention, the outer sheath 2 can surround one or more mechanical and chemical protective sheaths 3 and 4, in turn surrounding optical cladding 5 which is generally made of acrylate. Finally, the optical cladding 5 surrounds the fiber core 10 which is made of silica.

Figure 2:
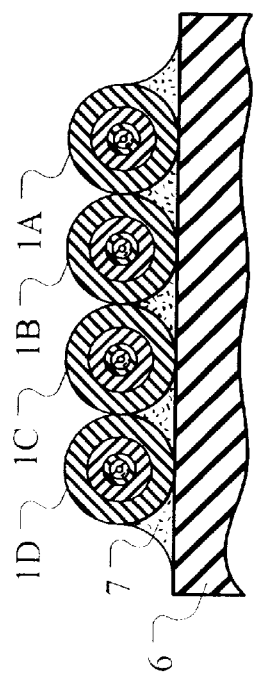
FIG. 2 is a highly diagrammatic section view showing optical fibers grouped together to form a ribbon.

The material known under the trademark "Hytrel" is a thermoplastic elastomer enabling a plurality of fibers to be grouped together to form a ribbon by heat-sealing the outer sheaths 2 of the optical fibers together. By way of non-limiting example, FIG. 2 shows a ribbon made up of four optical fibers 1A, 1B, 1C, 1D, and the ribbon is shown in place on the outer periphery of the support rod 6 of a composite insulator. To group together a plurality of optical fibers such as 1A to 1D so as to make up a ribbon, the outside surface of the outer sheath of each optical fiber is caused to melt slightly while the fibers are placed adjacent to one another in pairs, thereby making up an assembly by the outer sheaths welding together once they have cooled. During heat-sealing, the optical fibers that are placed adjacent one another in pairs are passed through a die so that they take up an appropriate ribbon or tape configuration.

As shown in FIG. 2, the ribbon of optical fibers 1A to 1D is stuck onto the support rod 6 using an adhesive agent which does not cover the optical fibers completely. More particularly, the ribbon of optical fibers is placed on a strip of adhesive agent that presents a width that is slightly greater than that of the ribbon of optical fibers and that presents a thickness that is approximately half the diameter of the optical fibers. As the adhesive agent, it is possible to use an epoxy resin mixture. Generally, the support rod 6 of a composite insulator is made of a composite of epoxy resin and glass fibers, so it is advantageous to use the epoxy resin mixture of the composite as the adhesive agent for sticking the optical fiber 1 or the ribbon of optical fibers to the outside surface of the support rod 6.

Figure 3:
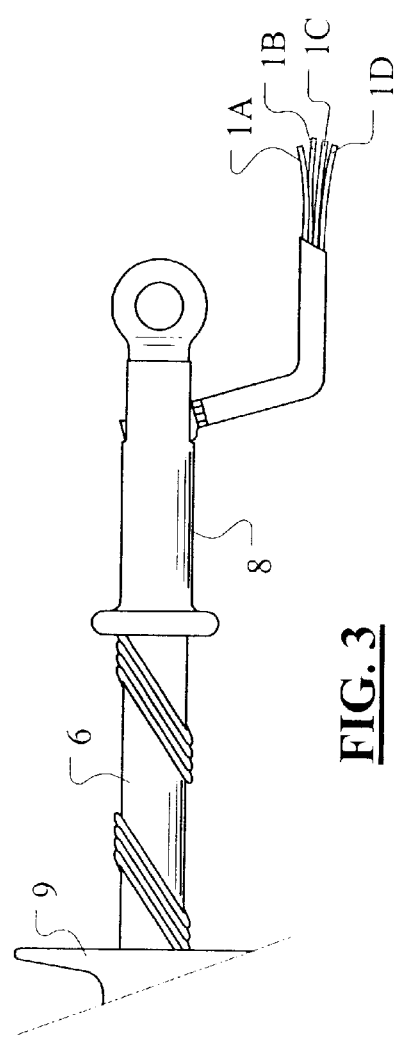
FIG. 3 is a highly diagrammatic fragmentary view showing a composite insulator of the invention with a ribbon of optical fibers placed on the support rod of the insulator.

FIG. 3 shows part of a composite insulator of the invention fitted with a ribbon of optical fibers. One end of the support rod 6 of the insulator is shown inserted in a metal end-fitting 8 of the insulator. The metal end-fitting 8 can be fixed to the support rod 6 in conventional manner by crimping, adhesive, shrink-fitting on its own, or with adhesive. Naturally, the insulator generally has two metal end-fittings fixed to respective ends of the support rod 6. After the metal end-fittings have been fixed onto the support rod, a layer of adhesive agent is placed on the outer periphery of the support rod, in this case in a helical configuration. The ribbon of optical fibers is passed through one of the two end-fittings and is laid flat onto the layer of adhesive agent following the same helical configuration, after which it is threaded through the other metal end-fitting of the insulator if the optical fibers are to extend from one end of the insulator to the other. The support rod fitted with the optical fibers in this way is then passed through an oven to accelerate setting of the adhesive agent. On leaving the oven, the ribbon of optical fibers is stuck very securely to the support rod. The last step in manufacturing the composite insulator of the invention then consists in depositing an insulating outer coating 9 around the support rod so as to cover the optical fibers. FIG. 3 shows a portion of the outer coating 9 of the insulator. This coating has fins or "sheds" formed in its outer periphery in well-known manner. The outer coating is generally an elastomer as stated above, and it is placed around the support rod by injection under high pressure and at high temperature or by extrusion so as to ensure that it fills all of the surface roughnesses on the outer periphery of the support rod. This prevents any risk of air inclusions being formed at the interface between the support rod and the outer coating, and along the optical fibers. After the outer coating has been put into place on the support rod, it is vulcanized, and because the outer sheaths of the optical fibers and the outer coating of the insulator are made of materials that are mutually compatible, a cohesive bond forms between them which guarantees a leaktight assembly. As shown in FIG. 3, the ribbon of optical fibers is undone at its end which projects outside the insulator so as to separate the optical fibers 1A to 1D. The optical fibers should be assembled together to form a ribbon as described above so as to ensure that the ribbon does not become undone while it is being put into place on the support rod while also ensuring that the fibers can easily be separated by hand.

Naturally, the invention extends to a composite insulator in which only one optical fiber is placed on the support rod of the insulator. Under such circumstances, there is no need for the outer sheath 2 of the fiber to have any thermoplastic properties.

What is claimed is:

1. A composite electrical insulator for a medium or high voltage substation or electricity line comprising a support rod, generally of a composite material; at least one optical fiber placed on the outer periphery of the support rod; and an outer insulating coating of a vulcanized insulating elastomer material surrounding the support rod to cover the at least one optical fiber, wherein the at least one optical fiber has an outer sheath of an elastomer material that is compatible with the material constituting the outer insulating coating so that a cohesive bond forms between the outer sheath of the at least one optical fiber and outer insulating coating of the support rod while the outer insulating coating of the support rod is being vulcanized.

2. An insulator according to claim 1, in which the material of the outer sheath of the at least one optical fiber is a thermoplastic material.

3. An insulator according to claim 2, having a ribbon of optical fibers that are welded together in pairs via their outer sheaths.

4. An insulator according to claim 1, wherein the support rod comprises an epoxy resin and glass fiber composite and in which each of the at least one optical fiber is stuck onto the support rod using an adhesive agent constituted by the epoxy resin and glass fiber composite.

5. An insulator according to claim 1, wherein vulcanization prevents any air inclusions being formed at the interface between said support rod and the outer insulating coating, and along said at least one optical fiber.

* * * * *

UNITED STATES PATENT AND TRADEMARK OFFICE
CERTIFICATE OF CORRECTION

PATENT NO. : 6,680,439 B2
DATED : January 20, 2004
INVENTOR(S) : D. Lepley et al.

It is certified that error appears in the above-identified patent and that said Letters Patent is hereby corrected as shown below:

Title page,
Item [73], Assignee, should read:
-- Sediver Societe Europeenne d'Isolateurs en Verre et Composite --

Signed and Sealed this

Twentieth Day of April, 2004

JON W. DUDAS
*Acting Director of the United States Patent and Trademark Office*